3,412,136
PROCESS FOR THE PREPARATION OF
ALIPHATIC NITRILES
Dorothee M. McClain and Irving L. Mador, Cincinnati, Ohio, assignors to National Distillers and Chemical Corporation, New York, N.Y., a corporation of Virginia
No Drawing. Filed Oct. 11, 1965, Ser. No. 494,860
15 Claims. (Cl. 260—465.3)

ABSTRACT OF THE DISCLOSURE

A process for the preparation of aliphatic nitriles such as alkyl nitriles, alkenyl nitriles and mixtures thereof by the reaction of a lower alkene, ammonia and oxygen in the presence of Group VIII noble metal-containing catalyst, e.g., palladium or platinum group metals, salts and oxides. The reaction may be carried out at temperatures ranging from about 90° to 175° C. and at atmospheric or near atmospheric pressures.

The present invention relates to a process for the preparation of alkyl nitriles and alkenyl nitriles as well as mixtures thereof. More particularly, the invention pertains to a process for the preparation of such aliphatic nitriles from low molecular weight olefins.

In recent years a number of processes have been proposed for the preparation of lower aliphatic nitriles. One such process is described in U.S. Patent No. 2,481,826 and comprises reacting an olefin with ammonia in the presence of oxygen to produce the desired aliphatic nitriles. Although it is stated that the use of an oxidation catalyst will enhance the process, the presence of such a catalyst apparently was not considered to be an essential feature of the invention. A later patent, U.S. Patent No. 2,904,580, is concerned with a similar process for the preparation of acrylonitrile wherein the improvement comprises conducting the reaction in the presence of certain specific catalysts; namely, the bismuth, tin, and antimony salts of phosphomolybdic and molybdic acids. The patentee states that the use of a bismuth phosphomolybdate catalyst is preferred and gives the most outstanding results. The reaction mixture comprising propylene, ammonia and oxygen is contacted with the aforementioned catalysts at a reaction temperature within the range of about 550° to 1000° F., and preferably from about 800° to 950° F. at atmospheric or near atmospheric pressures. The elaborate catalyst preparation as well as the very high reaction temperatures required are some of the disadvantages of the latter process.

One object of the present invention is to provide an improved process for the preparation of aliphatic nitriles.

Another object of the present invention is to provide a catalytic process for the preparation of lower alkyl and alkenyl nitriles as well as mixtures thereof from lower alkenes.

A further object of the present invention is to provide a process wherein an olefin is reacted with ammonia and oxygen in the presence of a catalyst to produce an aliphatic nitrile or mixtures thereof.

These and other objects of the present invention will become readily apparent from the ensuing description and illustrative embodiments.

In accordance with the present invention, it has now been found that aliphatic nitriles can be effectively prepared by contacting a reaction mixture comprising a lower alkene, ammonia and oxygen with a Group VIII noble metal-containing catalyst. This vapor phase process is conducted at a temperature within the range of about 90° to 175° C., and preferably within the range of about 100° to 130° C. The use of atmospheric or near atmospheric pressures, e.g., 100 p.s.i. is preferred, although pressures up to about 1000 p.s.i. may be employed without encountering deleterious results. The ability to carry out this process without the elevated temperatures and/or pressures prescribed in the prior art processes are important advantages of the present invention. In addition, fewer side reactions are encountered.

The olefinic starting material is a lower alkene having from 2 to 6 carbon atoms per molecule including ethylene, propylene, butene, isobutylene, hexene, and mixtures thereof. The use of either ethylene, propylene, or isobutylene is especially preferred. It will be understood that the source of the starting material is not critical, and that the alkene feed may contain moderate amounts of saturated hydrocarbons. Such maerials apparently do not enter into the reaction and constitute merely inert diluents.

The source of the oxygen is also unimportant, and for economic reasons it is preferred that air be employed as the source of oxygen. Nevertheless, it will be understood that substantially purified molecular oxygen can be employed to achieve particularly outstanding results.

The molar ratio of the alkene to oxygen to ammonia may range from about 1/0.1/0.1 to 1/1.5/1.5. In order to achieve maximum utilization of the feed materials, to minimize the amount of unreacted feed which is generally recycled for economic large scale commercial operations and to avoid the hazard of flammable composition, a suitable molar ratio of the reactants is about 6/1/2.

In accordance with another aspect of the present invention, it was found that the presence of water in the reaction mixture apparently favors increased yields of the aliphatic nitriles. This beneficial effect of water, generally in the form of water vapor, will be specifically illustrated hereinafter. In general, the molar ratio of alkene to water will range from about 4/1 to 50/1, and preferably from about 6/1 to 10/1. The theoretical reasons for the attainment of increased yields of the aliphatic nitriles by the use of water is not fully understood at this time. Moreover, it will be understood that the use of water as a component of the reaction feed mixture is not an essential feature of the instant invention, and that the reaction can be effectively carried out even in the absence of water.

The use of a Group VIII noble metal-containing catalyst is one of the most important features of the present invention. The catalyst can be any member of the platinum group or the palladium group of metals or an oxide or a salt thereof, either organic or inorganic. Preferably the catalyst is a Group VIII noble metal, salt, or oxide, specific examples of which include palladium, platinum, rhodium, ruthenium, osmium, irridium, palladous benzoate, palladous acetate, palladous propionate, ruthenium acetate, platinous benzoate, rhodium acetate, palladous chloride, rhodium trichloride, rhodium oxide, ruthenium chloride, ruthenium oxide, irridium chloride, and the like as well as mixtures thereof. The use of palladium metal is especially preferred.

The catalyst may be unsupported or supported on a suitable inert material such as carbon, silica, alumina, or the like. The use of an alumina support is preferred. It is also possible to increase the activity of the catalyst, if desired, by the addition of from about 1 to 10 equivalents per equivalent of metal catalyst of an alkali metal or alkaline earth metal salt, a transition metal salt promoter or mixtures of such promoters. Illustrative compounds which may be employed for this purpose include sodium acetate, potassium acetate, lithium hydroxide, calcium oxide, cobalt chloride, ferric chloride, ferric bromide, ferric acetate, cupric chloride, cupric acetate, manganese chloride, chromium chloride, sodium chloride, etc. An alkali metal salt, and especially sodium acetate, is the preferred promoter.

The process of this invention may be carried out in either a continuous or batch manner utilizing conventional vapor phase reaction equipment. The catalyst may either be employed in the form of a fixed or fluidized bed. It is also possible to employ conventional separation procedures for separating the desired aliphatic nitrile products from the gaseous reaction product mixture which, in addition to the aliphatic nitriles, may contain unreacted feed materials and by-products. As previously discussed, commercial operations would generally entail the recovery and recycling of unreacted feed materials. It will be further understood that neither the exact method of carrying out the present process nor the product recovery method are critical features of this invention.

The invention will be more fully understood by reference to the following illustrative embodiments.

EXAMPLE I

A glass reactor was filled with a catalyst bed of 2 percent palladium metal supported on alumina spheres. The catalyst had also been impregnated with sodium acetate. The reactor was jacketed so that it could be externally heated. The temperature was raised to 100° C. with a flow of dry nitrogen through the bed. At 100° C. the flow was switched to a mixture of 1.5 liters per hour of 15 percent oxygen in ethylene plus 0.5 liter per hour of anhydrous ammonia. The effluent from the reactor was passed through a trap cooled to about −25° C. containing a known amount of dimethyl formamide as a trapping liquid. After suitable time intervals, aliquots of the trap contents were gas chromatographed and shown to contain acetonitrile by comparison of elution time with a known sample of acetonitrile. The amount of acetonitrile corresponded to a production rate of 0.19 millimole per hour. A portion of the eluted peak from the chromotograph was collected and identified as acetonitrile by mass spectrographic analysis.

EXAMPLE II

The procedure of Example I was repeated but with a reactor temperature of 110° C. The production rate of acetonitrile was also 0.19 millimole per hour.

EXAMPLE III

The procedure of Example II was repeated but with a reactor temperature of 120° C., giving a production rate of acetonitrile of 0.23 millimole per hour.

The above data show that the process of this invention can be effectively employed to produce acetonitrile from a gaseous feed mixture comprising ethylene, ammonia and oxygen.

EXAMPLE IV

A glass reactor was filled with a catalyst bed of 2 percent palladium metal supported on alumina spheres. The reactor was jacketed so that it could be externally heated. The temperature was raised to 100° C. with a flow of dry nitrogen through the bed. At 100° C. the flow was switched to a mixture of 1.5 liters per hour of 15 percent oxygen in propylene plus 0.5 liter per hour of anhydrous ammonia. The effluent from the reactor was passed through a trap cooled to about −25° C. containing a known amount of dimethyl formamide as a trapping liquid. After suitable time intervals, aliquots of the trap contents were gas chromatographed and shown to contain acrylonitrile by comparison of elution time with a known sample of acrylonitrile. In a similar manner, acetonitrile was shown to be present. Portions of the eluted peaks from the chromatograph were collected and the identifications as acrylonitrile and acetonitrile confirmed by mass spectrographic analyses.

EXAMPLE V

The procedure of Example IV was repeated except that the catalyst was also impregnated with sodium acetate. Analysis again showed the production of acrylonitrile and acetonitrile.

EXAMPLE VI

The procedure of Example IV was repeated except that the propylene-oxygen stream also contained about 90 mm. partial pressure of water vapor. The results were similar to that of Example IV except that the amounts of acrylonitrile and acetonitrile produced was three- to four-fold greater.

As demonstrated above, the use of propylene in place of ethylene as a component of the reactor feed mixture resulted in the formation of a mixture of aliphatic nitriles comprising acrylonitrile and acetonitrile. The aliphatic nitriles may be recovered separately or in admixture and then separated from each other by the application of known techniques.

While particular embodiments of this invention are shown above, it will be understood that the invention is obviously subject to variations and modifications without departing from its broader aspects.

What is claimed is:

1. A process for the production of hydrocarbyl mononitriles selected from alkyl mononitriles and mixtures thereof with alkenyl mononitriles which comprises contacting in the vapor phase a reaction feed mixture consisting essentially of a lower alkene having from 2 to 6 carbon atoms per molecule, ammonia and oxygen with a Group VIII noble metal, oxide, lower alkanoate salt, benzoate salt or inorganic acid salt thereof as catalyst at a temperature within the range of about 90° to 175° C.

2. The process of claim 1 wherein the molar ratio of alkene to oxygen to ammonia is within the range of about 1/0.1/0.1 to 1/1.5/1.5.

3. The process of claim 1 wherein said catalyst is palladium metal.

4. The process of claim 1 wherein said catalyst is supported on an inert carrier.

5. The process of claim 4 wherein said inert carrier is alumina.

6. A process for the preparation of acetonitrile which comprises contacting in the vapor phase a gaseous feed mixture consisting essentially of ethylene, ammonia and oxygen with palladium metal catalyst at a temperature within the range of about 90° to 175° C.

7. The process of claim 6 wherein said catalyst is supported on an inert carrier.

8. The process of claim 7 wherein said inert carrier is alumina.

9. The process of claim 6 wherein said catalyst additionally contains from about 1 to 10 equivalents per equivalent of metal catalyst of sodium acetate as a promoter.

10. The process of claim 6 wherein said temperature is within the range of about 100° to 130° C. and the reaction is carried out at about ambient pressure up to about 100 p.s.i.

11. A process for the preparation of a mixture of acrylonitrile and acetonitrile which comprises contacting in the vapor phase a gaseous feed mixture consisting essentially of propylene, ammonia and oxygen with palladium metal catalyst at a temperature within the range of about 90° to 175° C.

12. The process of claim 11 wherein the molar ratio of propylene to oxygen to ammonia is about 6/1/2.

13. The process of claim 11 wherein the metal catalyst is supported on an alumina carrier.

14. The process of claim 11 wherein said catalyst additionally contains from about 1 to 10 equivalents per equivalent of metal catalyst of sodium acetate as a promoter.

15. The process of claim 11 wherein said temperature is within the range of 100° to 130° C. and the reaction is carried out at about ambient pressure up to about 100 p.s.i.

References Cited

UNITED STATES PATENTS 3,156,735  11/1964  Armstrong _____ 260—465.3 X
3,278,576  10/1966  Davis _____ 260—465.1 X JOSEPH P. BRUST, *Primary Examiner.*